US007156903B2

(12) United States Patent
McCombs

(10) Patent No.: US 7,156,903 B2
(45) Date of Patent: Jan. 2, 2007

(54) SOUND ENCLOSURE FOR PORTABLE OXYGEN CONCENTRATORS

(75) Inventor: Norman R. McCombs, Tonawanda, NY (US)

(73) Assignee: AirSep Corporation, Buffalo, NY (US)

( * ) Notice: Subject to any disclaimer, the term of this patent is extended or adjusted under 35 U.S.C. 154(b) by 8 days.

(21) Appl. No.: 10/932,154

(22) Filed: Sep. 1, 2004

(65) Prior Publication Data

US 2005/0045040 A1    Mar. 3, 2005

Related U.S. Application Data

(60) Provisional application No. 60/499,503, filed on Sep. 2, 2003, provisional application No. 60/499,540, filed on Sep. 2, 2003.

(51) Int. Cl.
*B01D 53/047* (2006.01)
(52) U.S. Cl. .............................. 96/109; 96/115; 96/121; 96/147; 96/384; 128/205.12; 128/205.27; 55/356
(58) Field of Classification Search ................ 96/108, 96/109, 114, 115, 117, 130, 380, 142–144, 96/381, 384, 385, 415, 416, 121, 147; 55/356, 55/357; 128/200.24, 204.18, 204.22, 204.26, 128/205.12, 205.25, 205.27
See application file for complete search history.

(56) References Cited

U.S. PATENT DOCUMENTS

| | | | | |
|---|---|---|---|---|
| 2,184,481 A * | 12/1939 | Aubrey | ............... | 62/427 |
| 2,572,009 A * | 10/1951 | Carson | ............... | 96/111 |
| 3,736,074 A * | 5/1973 | Kilbane et al. | ............... | 417/279 |
| 4,302,224 A * | 11/1981 | McCombs et al. | ............... | 96/109 |
| 4,342,573 A * | 8/1982 | McCombs et al. | ............... | 96/109 |
| 4,511,377 A * | 4/1985 | McCombs | ............... | 96/143 |
| 4,560,395 A * | 12/1985 | Davis | ............... | 96/381 |
| 4,786,299 A * | 11/1988 | DeMarco | ............... | 96/382 |
| 4,810,269 A * | 3/1989 | Stackhouse et al. | ............... | 96/381 |
| 5,871,564 A * | 2/1999 | McCombs | ............... | 95/98 |
| 6,174,342 B1 * | 1/2001 | Jeanseau | ............... | 55/385.2 |
| 6,447,586 B1 * | 9/2002 | Campbell | ............... | 96/415 |
| 6,494,940 B1 * | 12/2002 | Hak | ............... | 96/224 |
| 6,558,451 B1 * | 5/2003 | McCombs et al. | ............... | 95/98 |
| 6,764,534 B1 * | 7/2004 | McCombs et al. | ............... | 96/111 |
| 6,866,700 B1 * | 3/2005 | Amann | ............... | 95/273 |
| 6,908,503 B1 * | 6/2005 | McCombs et al. | ............... | 96/130 |
| 6,949,133 B1 * | 9/2005 | McCombs et al. | ............... | 96/111 |
| 2002/0066371 A1 * | 6/2002 | Campbell | ............... | 96/415 |
| 2003/0213368 A1 * | 11/2003 | Roberts et al. | ............... | 96/381 |
| 2005/0166921 A1 * | 8/2005 | DeVries et al. | ............... | 128/204.21 |
| 2005/0204923 A1 * | 9/2005 | Nakamura et al. | ............... | 96/128 |

* cited by examiner

*Primary Examiner*—Robert A. Hopkins
(74) *Attorney, Agent, or Firm*—Hiscock & Barclay, LLP

(57) ABSTRACT

A portable pressure swing adsorption apparatus and conservation device for medical use, and a sound enclosure for the apparatus having two isolating sections to enclose the apparatus, the enclosure having an inlet in one of the sections for allowing ambient air into the enclosure and an outlet in the other section for enabling waste gases from the apparatus to exit the enclosure and causing the ambient air and waste gases substantially to change direction within the enclosure before entering or exiting the apparatus.

10 Claims, 11 Drawing Sheets

SOUND ENCLOSURE FOR PORTABLE OXYGEN CONCENTRATORS

REFERENCE TO PRIOR CO-PENDING APPLICATIONS

This application claims the benefit of co-pending U.S. Provisional Patent Application No. 60/499,503 and No. 60/499,540, both filed Sep. 3, 2003.

The present invention relates generally to oxygen concentration apparatus, and more particularly to the concentration of oxygen by pressure swing adsorption.

I. BACKGROUND OF THE INVENTION

Generally, pressure swing adsorption or PSA is used to increase the concentration of a selected gas from a mixture of gases. In particular, an oxygen concentrator, for example for medical or therapeutic use, increases oxygen concentrations from ambient air to therapeutic levels for inhalation by a patient. One such PSA oxygen concentrator is the successful portable oxygen concentrator distributed by AirSep Corporation of Buffalo, N.Y. under the trademark LIFESTYLE, the principles of which are described in co-pending U.S. patent application No. 10/762,671, filed Jan. 22, 2004, which is a continuation application of an application on which U.S. Pat. No. 6,764,534, McCombs et al, issued Jul. 20, 2004. The entire disclosures of both the co-pending application and the patent are incorporated by reference. Because of its very compact size, a concentrator made as described is particularly attractive for use by patients who want to be highly mobile and yet be able to use the same device while inactive or asleep. Oxygen concentrators have significant advantages for patient use over other common oxygen sources such as liquid or pressurized gaseous oxygen tanks. However, because oxygen concentrators by their very nature move substantial volumes of ambient air, product gas and waste gases, they necessarily can generate levels of noise that may be less desirable in certain uses and environments. To counter that problem, I have developed novel and useful sound enclosures that will substantially reduce even further the emitted noise while at the same time not affect the operation or efficiency of the concentrators.

II. SUMMARY OF THE INVENTION

While the sound enclosures as described in this application are especially suited for portable oxygen concentrators described in the foregoing U.S. patent, it will be seen from the description that alternative embodiments of the invention may be used with oxygen concentrators having different configurations and/or capacities, including the alternate concentrator particularly described in this application. In principle, the invention encloses the apparatus and yet allows air to enter the interior of the enclosure without affecting the flow rate and causes the air to be redirected before it reaches the inlet of the oxygen concentrator. Similarly, the enclosure does not reduce the flow rate of waste gases exiting the concentrator, but rather prevents the waste gases from mixing with the incoming ambient air and redirects the waste gases before exiting the enclosure. Other aspects, features and details of the invention will be more apparent in the accompanying drawings and the following detailed description of preferred embodiments of the invention.

III. BRIEF DESCRIPTION OF THE DRAWINGS

IV. DETAILED DESCRIPTION OF PREFERRED EMBODIMENTS

Figure 1A:
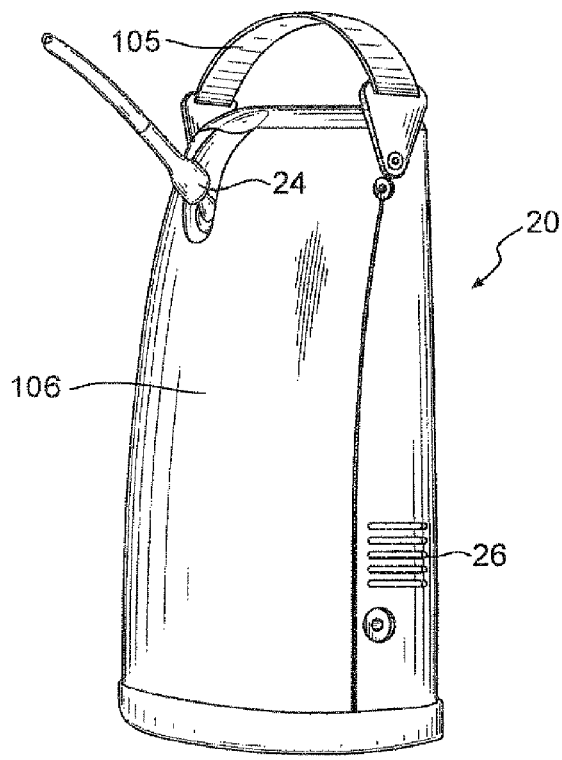
FIGS. 1a and 1b are illustrations of an oxygen concentrator with which one preferred embodiment of the invention may be used.
Figure 1B:
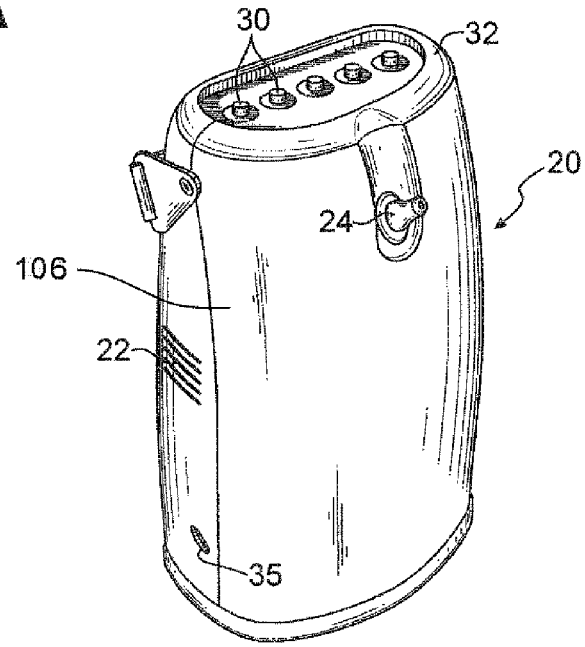

In accordance with the present invention, there is shown in FIGS. 1a and 1b a highly portable oxygen concentrator such as will be described in more detail. The concentrator generally is indicated as 20 and comprises a combined pressure swing adsorption apparatus and an oxygen conserving device, or PSA/OCD, used for fractionating nitrogen from ambient air by pressure swing adsorption to produce the oxygen concentrated product gas, and for delivering the product gas in pulse doses at specific and variable intervals upon demand by a user. The ambient air is supplied to the PSA/OCD apparatus 20 through a filtered intake 22, from which the air is divided into a feed gas to be fractionated and a cooling air to flow through the apparatus to cool the components. The feed gas is alternately fed to nitrogen adsorption beds to produce the product gas to be delivered to the patient from a product gas outlet 24 in a pulse dose mode incorporated into apparatus 20. At the same time, the adsorbed nitrogen is purged sequentially from the adsorher beds to form a waste gas that is discharged along with the coolant air to the atmosphere through an outlet vent 26.

The pulse dose component primarily delivers the oxygen concentrated product gas only at the initial stage of inhalation, with the effective flow rate set by user accessible control switches 30 on an operating panel that is accessed by opening a hinged transparent or translucent cover 32 at the top of apparatus 20. Other operating features such as indicator lights and alarms may also be visibly located below cover 32. To operate the apparatus 20, one of the switches 30 appropriate to the desired oxygen flow rate is pressed both to turn on the PSA, if not otherwise operating at a different equivalent flow rate, and to deliver the concentrated oxygen gas at the set rate.

Apparatus 20 can be powered by any one of a number of sources, including a removable, rechargeable battery pack, an AC adapter to connect the apparatus at connector 35 to an AC outlet; a "cigarette lighter" adapter for a similar connection to an automobile battery, and a supplemental battery pack connectable to the apparatus, the supplemental battery pack either extending the operating time made available by the removable battery pack or itself being charged along with the removable battery pack when the apparatus is attached through an adapter to an AC outlet or automobile battery.

Although the two versions of portable oxygen concentrators referred to above have been designed to significantly reduce sound and vibration both from the moving gases and from the principal noise generating components within the concentrators, which may include a fan, an intake resonator, a compressor/heat exchanger assembly, feed and waste valves, and a sound absorbing muffler, the present invention will substantially minimize remaining audible sound so that the apparatus will not be even marginally disturbing to nearby people in quiet settings or during periods of rest or sleep.

Referring now to FIGS. 2a–2f, which illustrate the first preferred embodiment, a sound enclosure 40 according to the invention and enclosing an example apparatus 20 is comprised of a top half 42 and a bottom half 44 with internal compartments to hold the apparatus and when joined together substantially enclose apparatus 20. Bottom half 44 includes a cradle portion 48 at its bottom, in which apparatus 20 is nested. Bottom half 44 preferably may include, e.g., three or four shock absorbing springs 48a having about a 10% compression to support apparatus 20. When joined, the two halves may include a releasable latch 46 of any suitable known type to hold the halves together. The outer walls of each half is preferably made of a plastic foam material of a sound absorbing open cell structure, the outer surfaces of which are rigidized to form smooth surfaces. The cradle 48 preferably is made of a higher density foam to provide positive support and to absorb shock and vibration as well as sound. The interior surfaces of the halves 42, 44 and cradle 48 may be further coated with a sound absorbent.

According to the invention, upper shell half 42 includes a filtered air inlet 43 sized to enable ambient air to enter the interior of the sound enclosure 40 at the same rate as if apparatus 20 were to operate without the enclosure. At the lower periphery of top half 42 is an annular separator wall 54 made of a flexible material such as VITON® that provides a seal when the two halves 42, 44 are joined, effectively separating the air spaces between the respective halves and the apparatus 20. The inner edge of wall 54 is shaped generally to conform to the periphery of apparatus 20 at the plane of engagement, but at a size sufficiently smaller to ensure a seal, but not so small as to make difficult the installation of top half 42. Although other means to affix the separator wall 54 may be used, screws are shown to enable its replacement for various possible reasons such as repair or modularity for use of the enclosure with concentrators of different cross sections. Preferably, wall 54 is relatively firm where affixed to top half 42 and flexible otherwise.

The inner surfaces of the two halves 42, 44, except at the nesting ends, are spaced from the outer walls of the apparatus 20, e.g., about ⅛' to about ⅜", to allow an amount of air in volume sufficient to operate the apparatus and to circulate around the apparatus. As shown, and according to the invention, filtered inlet vent 43 in on the side of top half 42 diametrically opposite to the inlet 22 of apparatus 20 to force the entering air to flow around the upper half of the apparatus before passing through inlet 22. The change in air flow direction is one important means by which the noise level is reduced. In like manner, bottom shell half 44 includes a filtered exhaust vent 45 on the side diametrically opposite to exhaust vent 26, which also causes the exhaust waste gases and cooling air to change flow direction by flowing around the bottom half of apparatus 20 before exiting the sound enclosure 40 at enclosure outlet 45. The air and waste gas paths are dimensioned to interfere with noise transmission but not restrict air flow into or waste gas out of apparatus 20. Preferably, both vents 43, 45, as well as the space between apparatus 20 and the inner walls of enclosure 40, are about 50% larger in cross sectional area than the corresponding intake 22 and outlet vent 26. For example, if intake 22 and outlet vent 26 each have a cross sectional area of about 2 in$^2$ then the cross-sectional areas of vents 43, 45 and the space between apparatus 20 and enclosure 40 preferably are each about 3 in$^2$.

The top shell half 42 contains a transparent or translucent window 57 by which the various controls and indicia on the control panel of apparatus 20 may be viewed without opening the enclosure. If desired, window 57 may be configured to open by suitable means in order to access the control panel without removing top shell half 42. Also as shown, window 57 includes a fixed opening through which the cannula tube is passed for attachment to the cannula connector 24 on apparatus 20. A channel 59 is formed as shown in the bottom shell half 44 at the interface with top shell half 42, through which the cable of an AC or car battery adapter can be passed for connection to apparatus 20.

Figure 3:
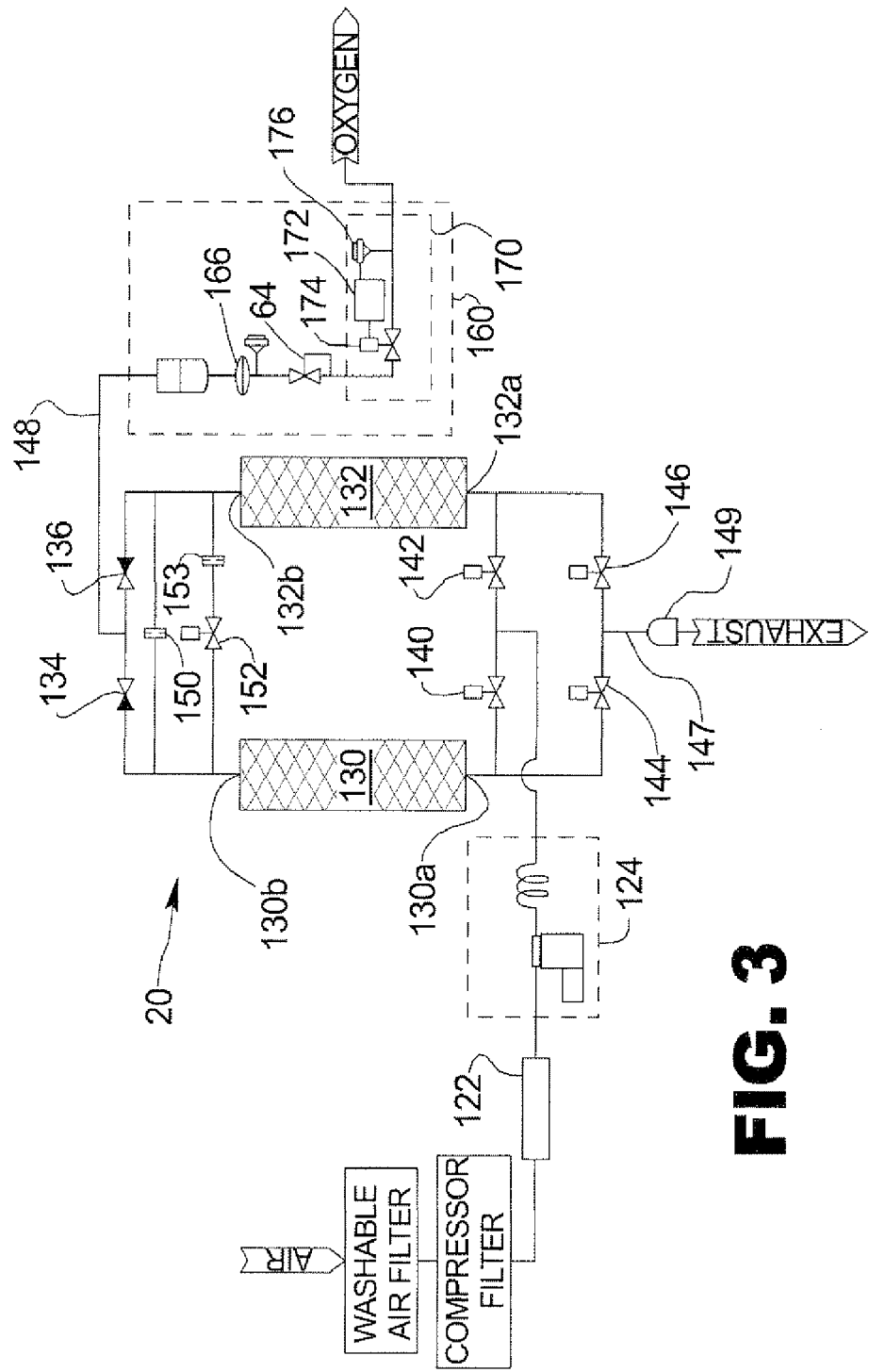
FIG. 3 is a schematic illustration of the operating elements of a typical oxygen concentrator.
Figure 4A:
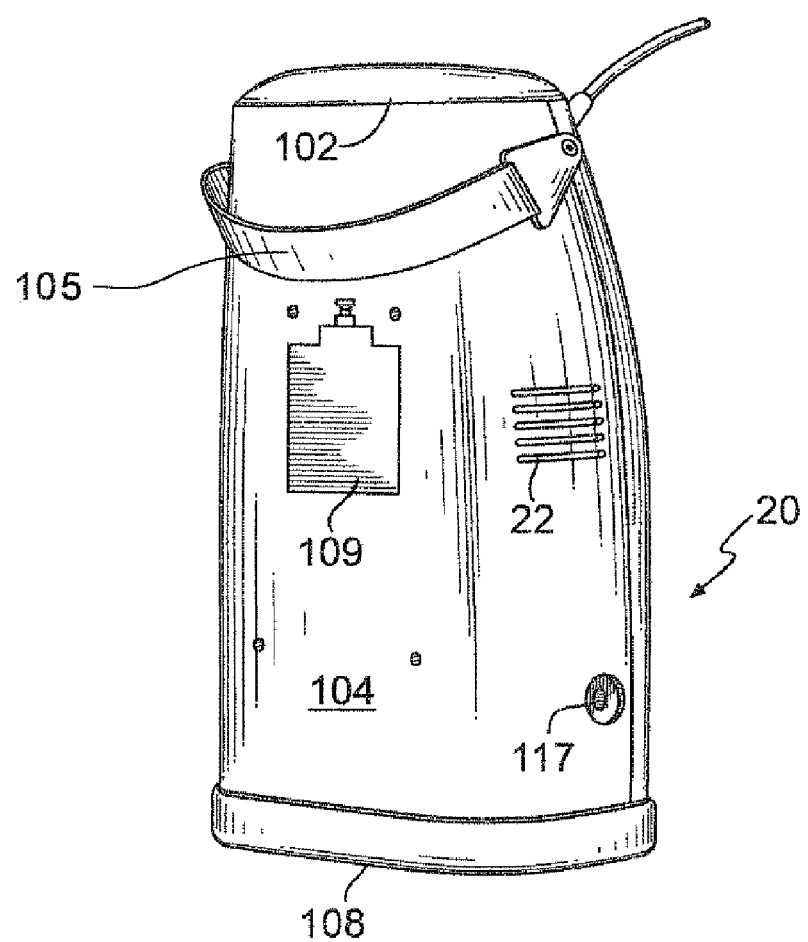
FIGS. 4a–4e are further views of the oxygen concentrator shown in FIGS. 1a–1b.
Figure 4B:
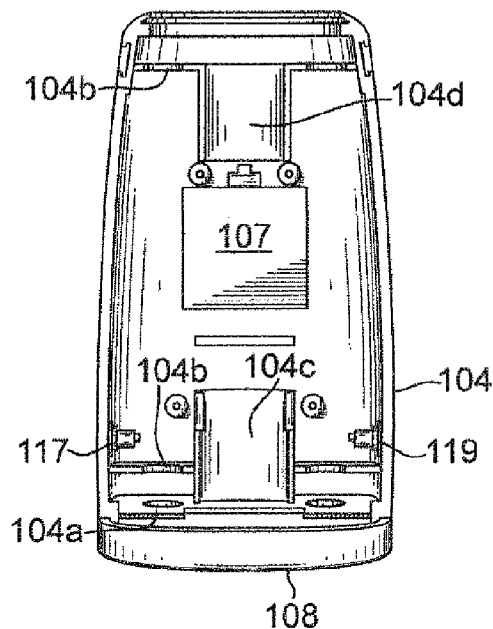
Figure 4C:
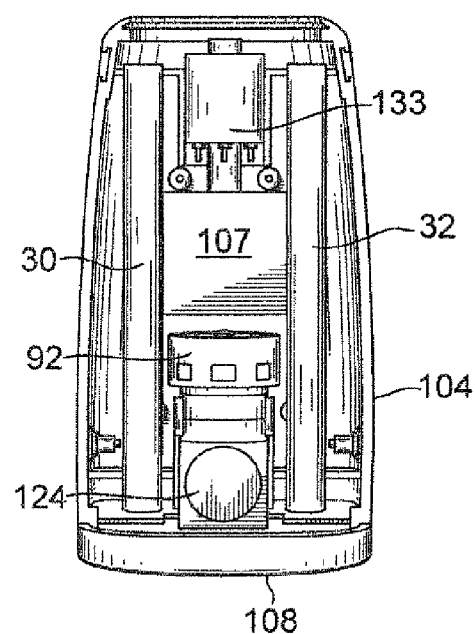
Figure 4D:
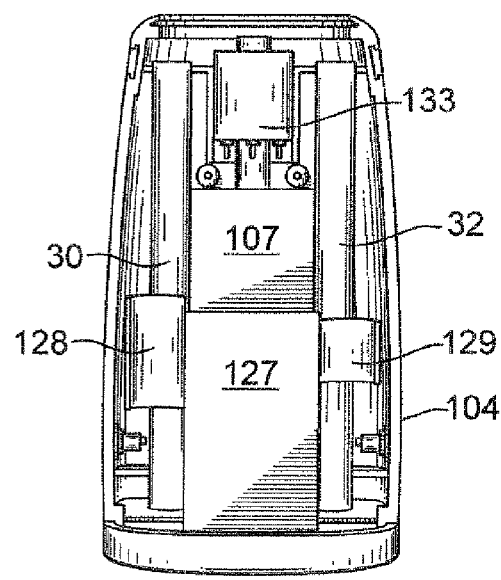
Figure 4E:
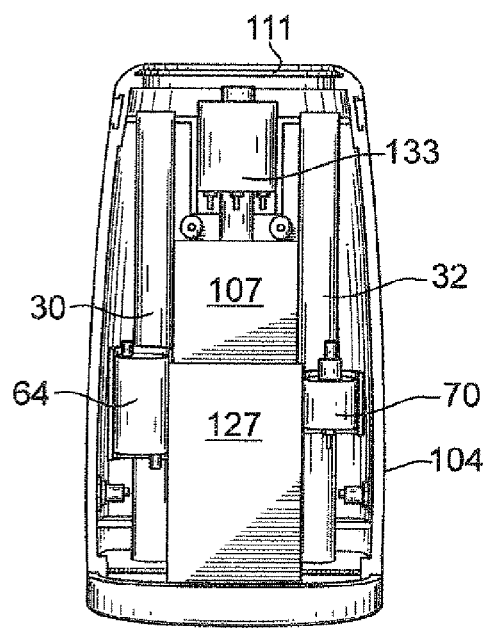

The general operating principles of the PSA apparatus illustrated in FIGS. 1a and 1b are shown by reference to FIG. 3. Ambient air is supplied to the PSA/OCD apparatus 20 through filtered intake 22 and an intake resonator 122 to decrease the noise from the intake of the ambient air feed stream. The feed stream continues from resonator 122 and is moved from its outlet by a feed air compressor 124 alternatively to first and second adsorbers 130, 132 through feed valves 140 and 142 respectively.

When the feed stream alternatively enters inlets 130a, 132a of adsorbers 130, 132 in a co-current direction, the respective adsorber fractionates the feed stream into the desired concentration of product gas. The adsorbent material used for the beds to separate nitrogen from the ambient air may be a synthetic zeolite or other known adsorber material having equivalent properties.

The substantial or usable portion of the oxygen enriched product gas generated by the ambient air flowing in the co-current direction sequentially in each one of the adsorbers 130, 132 is directed through the outlets 130b, 132b and check valves 134, 136 of the corresponding adsorber to a product manifold 148 and then to a delivery control assembly, as will be described. The balance of the product gas generated by each adsorber is timed to be diverted through a purge orifice 150 and a properly timed equalization valve 152 and an optional flow restrictor 153 to flow through the other adsorber 130 or 132 in the counter-current direction from the respective outlet 130b, 132b and to the respective inlet 130a, 132a of the other adsorber to purge the adsorbed, primarily nitrogen, gases. The counter-current product gas and purged gases then are discharged to the atmosphere from the adsorbers through properly timed waste valves 144, 146, tubing 147 and a sound absorbing muffler 149.

Control assembly 160, to which the usable portion of the produced gas is directed, delivers the product oxygen to the user through apparatus outlet 24 in the pulse dose mode. It includes a piston-type pressure control regulator 64 to regulate the product gas pressure to be delivered to the user, a bacteria filter 166, and an oxygen delivery system 170 including a pulse dose transducer 172 including the OCD components, a flow control solenoid operated valve 174, and a low pressure sensor 176.

According to the invention, delivery of the PSA generated oxygen concentrated gas to the user is controlled by delivery system 170 as is more fully described in U.S. Pat. No. 6,764,534. As described in that patent, the produced high oxygen concentration gas is delivered to the user only during the initial stage of inhalation and only for a period of time determined by the user setting the accessible apparatus controls.

Figure 2A:
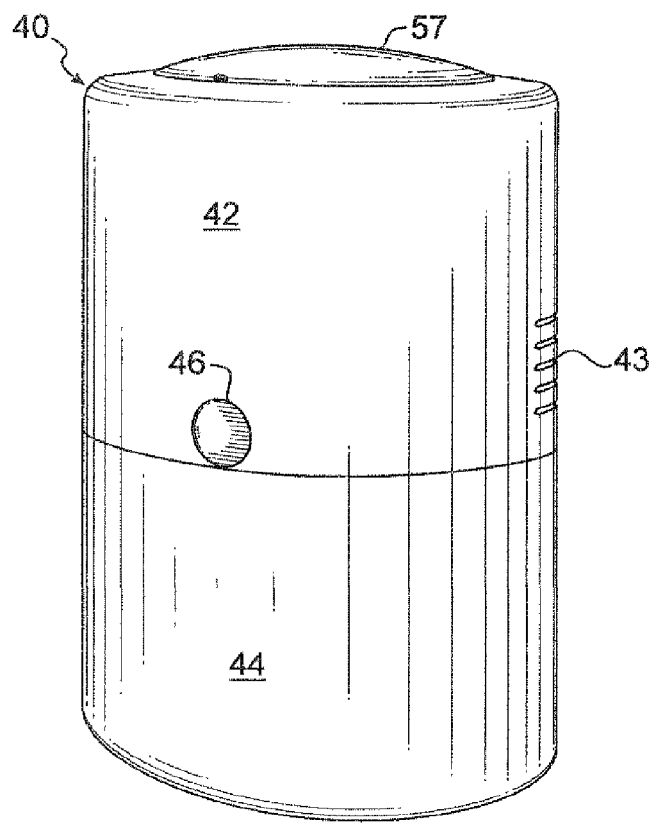
FIGS. 2a–2f are various views of the one preferred embodiment both with and without the oxygen concentrator of FIGS. 1a and 1b in place.
Figure 2B:
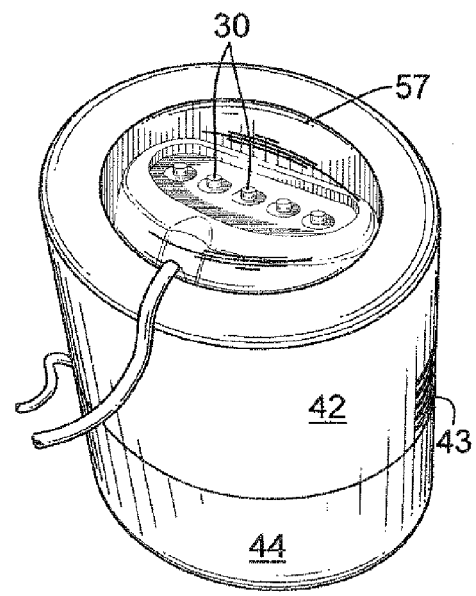
Figure 2C:
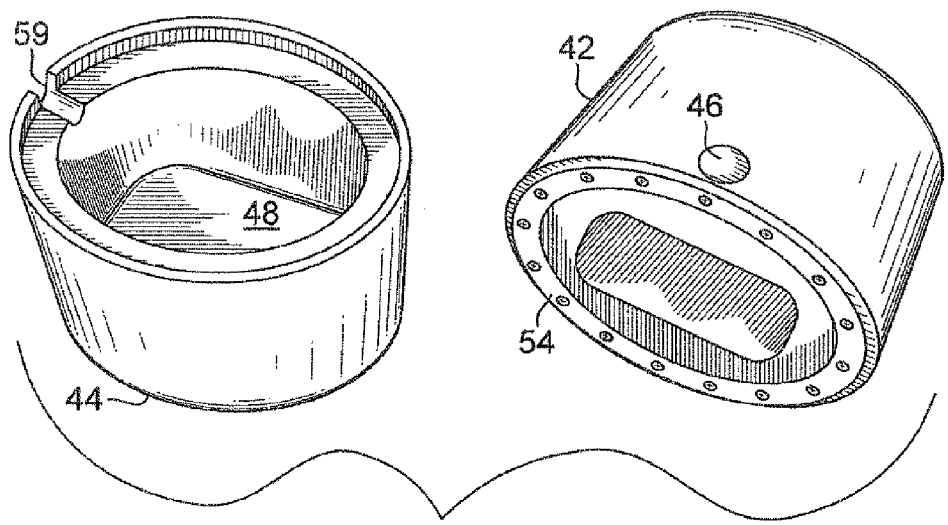
Figure 2D:
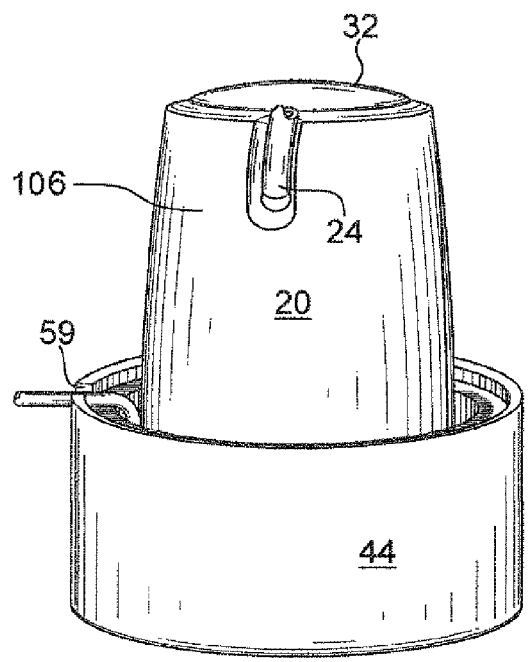
Figure 2E:
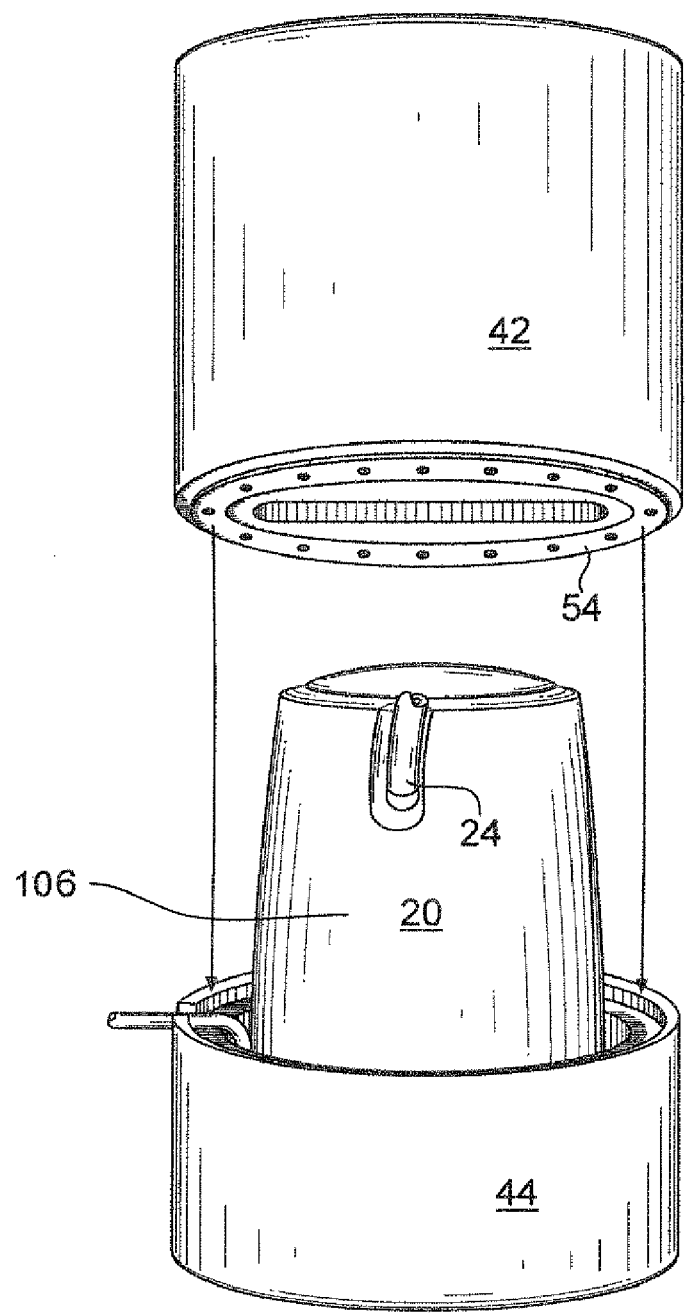
Figure 2F:
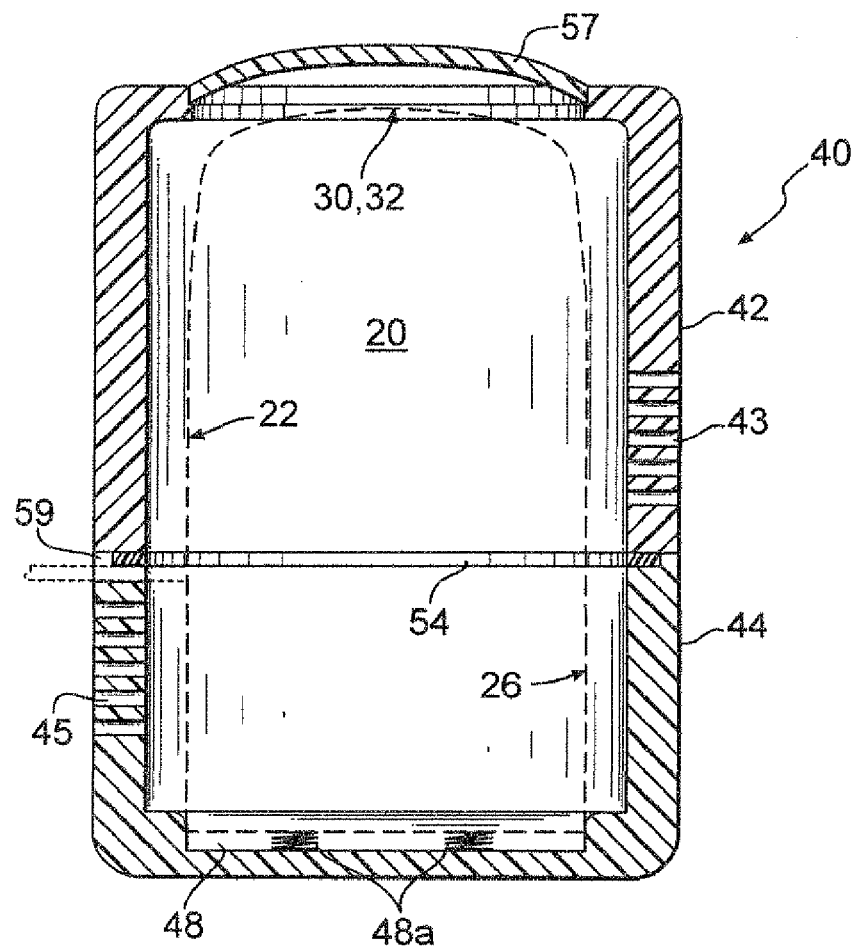

The setting is made by the multiple buttons 30 which, as shown in FIG. 2b are accessed is by opening cover 32 hinged to the back housing portion 104 of the apparatus 20. One of the buttons 30 then is depressed to set the flow period which by the indicia "1" through "5" indicate equivalent continuous flow rates of 1–5 1 pm. Cover 102 preferably is held closed by a magnetic latch for both a secure closure and easy opening. The operating components of apparatus 20 are further enclosed by a front housing portion 106 and a base 108.

The outer housing portions 104, 106 may be of any suitable impact resistant material, but preferably an injection molded ABS plastic. The outer housing portions 104, 106 as shown also include a key shaped slot in which can be inserted a removable handle 105 as shown, a shoulder strap or a back pack type carry means.

According to the invention as illustrated in FIGS. 4a–4e, the apparatus 20 is oriented vertically with base 108 containing arcuate slots into which are inserted housing portions 104, 106. Molded into back housing portion 104 is a recess 107 that receives a removable rechargeable battery pack that is then held in place by a cover 109. Back housing portion 104 further includes the louvered opening 22, preferably with a suitable air particle filter, by which ambient air is introduced into the apparatus interior. Rear housing 104 also contains the louvered exhaust vent 26, preferably filtered, by which both the waste gases from the adsorber beds and the cooling air is exhausted from the apparatus interior. Also shown are a pair of electrical sockets 117, 119, socket 117 to receive an AC adapter to enable the apparatus to operate by AC current, whereas socket 119 enables the connection of an auxiliary battery pack that will extend the operating time when the apparatus is operating by battery power and will recharge the auxiliary battery pack while the apparatus is powered by AC current.

Front housing 106 as shown includes a recess that supports cannula connection 24, the connection being pivotable to enable the cannula tube end to move from horizontal to vertical positions to reduce any likelihood of kinking. At the top of housing portions 104, 106 is a control panel 111 fitted into slots formed by the housing portions. Control panel 111 supports both the operating controls and indicators accessible from above and on its bottom surface a circuit board containing a portion of the operating circuit.

As shown by FIGS. 4a–4e, the apparatus is assembled first by inserting the adsorber beds 130, 132 into open nests 104a that enable tubing to be connected from below to the adsorber bed inlets and held in place by the formed brackets 104b in back housing 104 as shown. Then a combined fan 92 and compressor 124 assembly is mounted to the back housing in bracket 104c to be nested between the adsorber beds and below the battery recess 107. The combined fan 92 compressor 124 assembly may be made according to the invention disclosed in co-pending U.S. Provisional Patent Application No. 60/499,500, McCombs et al, filed Sep. 2, 2004, and for which a non-provisional patent application No. 10/932183 is filed on even date herewith and published Mar. 3. 2005 under No. 2005/0047947, the entire disclosures of which are incorporated by reference. Fan 92 pulls the ambient air into the apparatus through inlet 22 both to be drawn into compressor 124 to produce the concentrated oxygen gas and the balance to circulate around the operating element before being discharged through louvered vent 26. Fan 92 and compressor 124 are axially aligned to be operated by a common fractional motor positioned between them and having opposing drive shafts to drive the fan and compressor.

A valve assembly 133 with multiple poppet valves is then attached to the back housing 104 in bracket 104d. Valve assembly 133 may comprise a rotary cam valve made according to the invention described in co-pending U.S. Provisional Patent Application No. 60/499,542, Rotary Cam Valve, McCombs et al, filed Sep. 2, 2004, and for which a non-provisional patent application No. 10/932,191 is filed on even date herewith and issued Nov. 1, 2005 as U.S. Pat. No. 6,959,728, the entire disclosures of which are incorporated by reference. Rotary cam valve 133 incorporates into one unit all of feed valves 140, 142, waste valves 144, 146 and equalization valve 152. An open ended cover 127 is mounted over the fan 92 and compressor 124 to assist in controlling air flow. Integrally molded to cover 127 are a pair of retainer brackets 128 and 129, on one of which is mounted the regulator 64 and on the other of which is mounted the flow control device 170.

Inside the front housing 106 is mounted another circuit board (not shown) containing the balance of the electrical and electronic operating components, which together with the components on the circuit board underneath control panel 111 form the operating circuit which may be as disclosed in U.S. Pat. No. 6,764,534. Suitable tubing, although not illustrated, connects the operating elements to each other in the sequence shown in FIG. 3. Similarly, electrical wiring is provided to interconnect the two circuit boards, the installed battery and the connector sockets 117, 119 to the AC adapter and an auxiliary battery.

As described earlier, ambient air enters the interior of the apparatus 20 through the vent opening 22. The ambient air is caused by fan 92 to enter the enclosed interior enclosed chamber of apparatus through an accessible inlet particulate filter, for example of a material designed to remove dust and other impurities, from the air entering the apparatus interior.

Because of the novel design and combination and placement of elements comprising the invention, a combined PSA/OCD based on that embodiment, for example, can weigh less than about five pounds be able to deliver, at standard atmosphere, an oxygen concentration of about 90%±3% in pulse doses at therapeutically equivalent continuous flow rates within a range of about 0.5 to 3 1 pm. In addition to the significantly low weight, apparatus 20 may measure less overall than 9" in height, 6" in width and 4" in depth.

In the embodiment shown, each of the adsorber beds 130, 132 for a medical application may be about 7 inches in length and about 1 inch in diameter, with the zeolite sieve material. Preferably, the beds 130, 132 are spring biased in order not to "fluidize" the sieve material in their depressurization or pressure equalization stages. The feed stream of air is provided at a nominal rate of about 7 liters per minute, to produce a product gas within an approximate operating pressure range from about 19 psia to about 23 psia, or about 21 psia when powered at about 13 volts, with the setting at 3 1 pm and a user breathing rate of about fifteen breaths per minute.

The concentration of the oxygen supplied by the apparatus for each flow control setting is dependent on system pressure, operating voltage (battery or external supply), and patient breathing rate within allowable ranges of these parameters. In the circuit, the microprocessor calculates continuous or sampled readings of the selector position, the operating voltage, and the frequency of actuation of the OCD, the predictable oxygen concentration being delivered to the user. If any of these approach the upper or lower thresholds, for example as low as 85% oxygen concentration, an intermittent alarm on control panel 111 may be provided to warn the user that he or she can continue to use the apparatus, but should take action to prevent the performance from falling outside of specifications. If any of the parameters regularly exceeds the predetermined thresholds, for example at a calculated oxygen concentration of 80% or less, the alarm may be programmed to sound continuously to notify the user that the performance of apparatus 20 is outside of specifications and its use discontinued.

As disclosed in U.S. Pat. No. 6,764,534, the embodiment shown may also include an audible signal at startup of the apparatus, both audible and a red visual light alarms to signal high and low pressure, system overdraw, and an apnea event (i.e., the absence of inhalation within a preset time), audible and yellow visual light alarms to signal a low battery condition, and a pulsing green light to indicate normal apparatus operation in a pulse mode.

Similarly, maximum breathing rates for the apparatus may be determined for the combination of each flow control switch setting and range of voltages that control the apparatus. The circuit may continuously monitor the battery voltage, flow control switch setting, and the patient's breathing rate. If the breathing rate causes the apparatus to approach an overdraw condition (an oxygen concentration of about 85%) or to reach overdraw (a concentration of about 80% or less), the alarm either warns or alerts the patient to moderate his or her physical activity.

It is possible to use a three bed PSA as described in U.S. Pat. No. 6,558,451. It also is possible to include a known oxygen monitor such as an oximeter to measure the actual rather than the calculated concentration of oxygen being delivered to the user. In addition, those skilled in the art maybe able to include other known safety features for use in monitored and/or unmonitored medical purposes. If it also is desired to be able to variably control the concentration of oxygen in the product gas, one can incorporate into the invention a second adjustable purge loop, not shown but described in U.S. Pat. No. 5,871,564.

Figure 5:
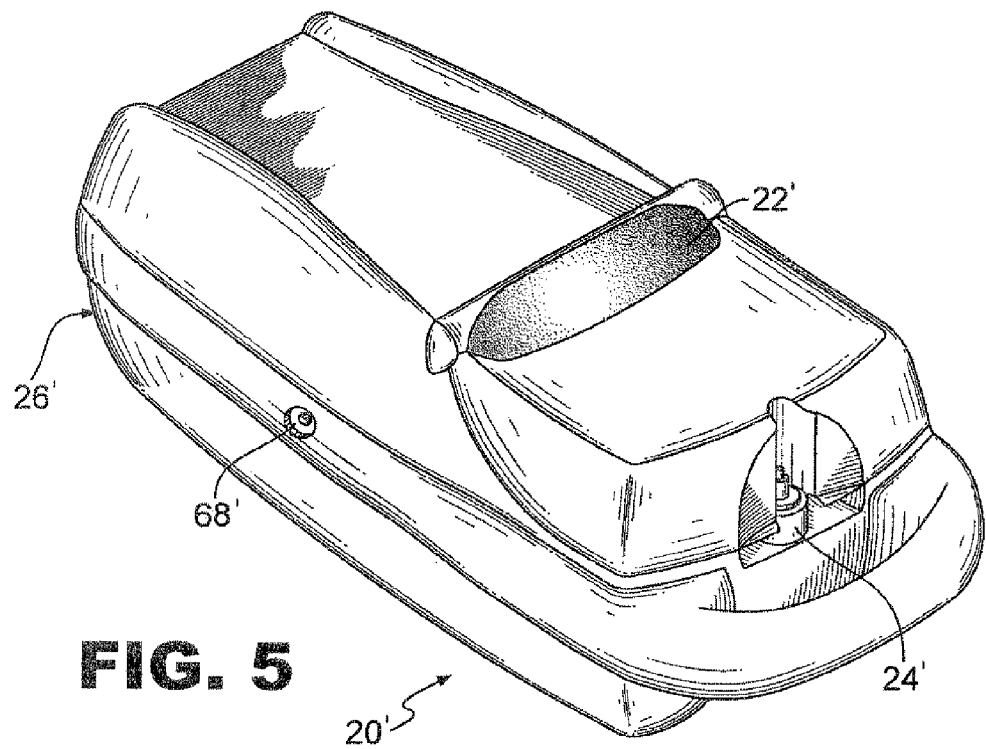
FIG. 5 is an illustration of an oxygen concentrator with which a second preferred embodiment of the invention may be used.
Figure 6B:
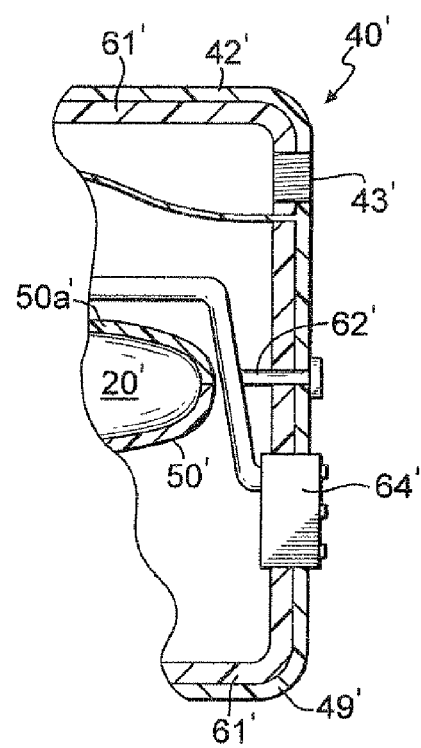
FIGS. 6a–6b are views of the second preferred embodiment with the oxygen concentrator of FIG. 5 in place, with the cover both closed for use and open for access to the operating controls.
Figure 6A:
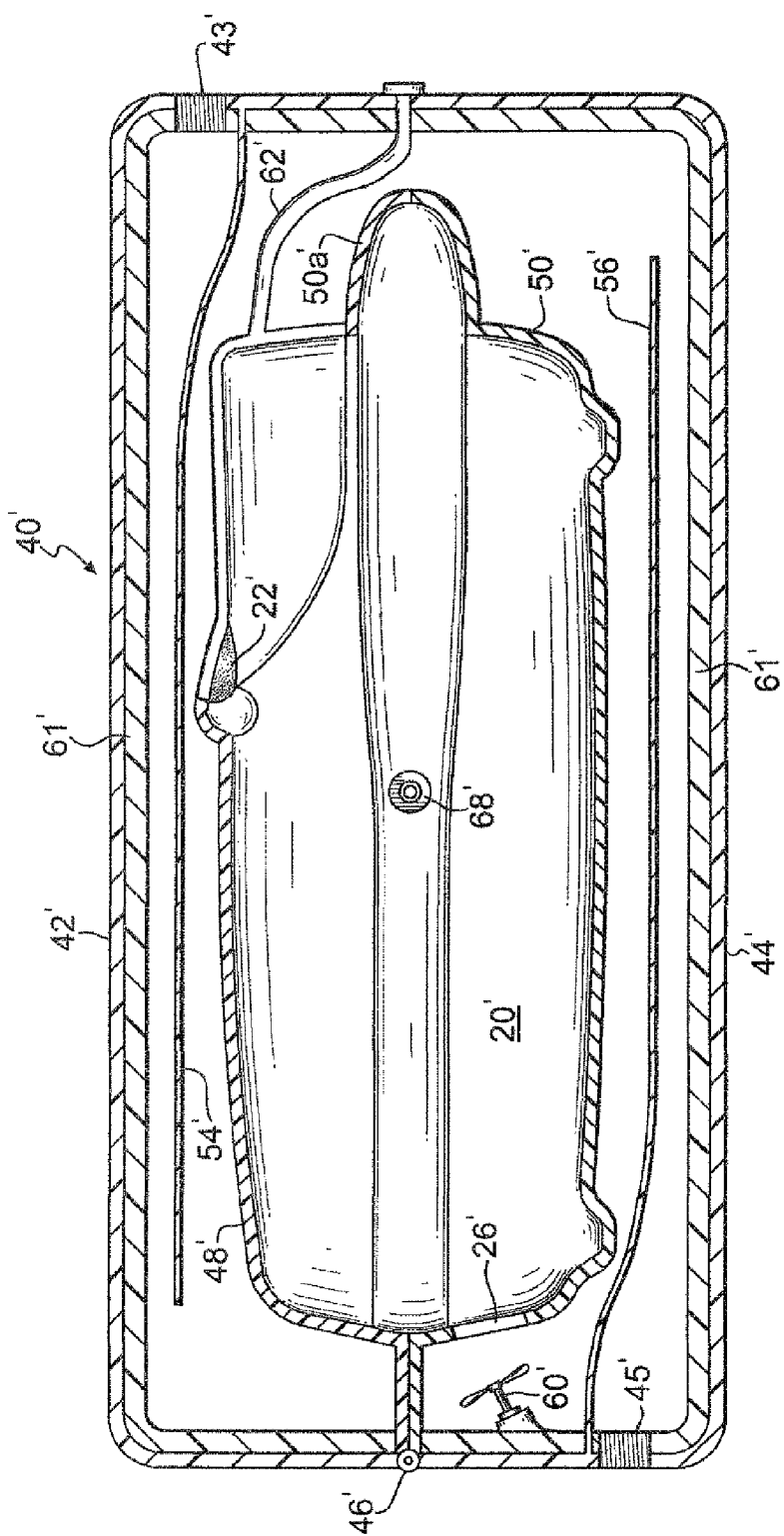

FIGS. 6a–6b illustrate a second preferred embodiment of a sound enclosure suitable for use with an oxygen concentrator as illustrated in FIG. 5 and shown and described in U.S. Pat. No. 6,764,534 and Design Patent No. D468,017. Unless otherwise described, parts of this second embodiment of the sound enclosure, with primed numbers, correspond in material and function to similarly numbered parts of the first embodiment, except of course for size and dimensional differences needed to accommodate the different shape of the apparatus. In this embodiment, sound enclosure 40' enclosing an example apparatus 20' is comprised of a top half 42' and a bottom half 44' hinged at 46' a clam shell which when closed substantially encloses apparatus 20'. Each of halves 42', 44' includes a cradle portion 48', 50' in which apparatus 20' is nested. Cradle 48' is open at the front to enable ambient air to enter apparatus 20', whereas lower cradle 50' includes a portion 50a' overlapping the apparatus handle to secure the apparatus 20' from movement as the enclosure 40' is being transported.

As with the first embodiment, upper clam shell half 42' includes a filtered air inlet 43' sized to enable ambient air to enter the interior of the sound enclosure 40' at the same rate as if apparatus 20' were to operate without the enclosure. As shown in cross-sectional FIG. 6a, input vent 43' is located in the front side wall of top shell half 42' nearest the inlet 22' of apparatus 20'. In order to provide a flow change direction with input vent 43' at this location, there is provided within top half 42' a separator wall 54' that forces the entering air to flow first to the rear of apparatus 20' and then to reverse direction to flow to the front to enter apparatus intake 22'. In like manner with exhaust vent 45' located in the back side wall of bottom clam shell half 44' also preferably includes a separator wall 56' to force the waste gases and cooling air exiting outlet 26' first to flow toward the front of apparatus 20' before reversing direction to exit sound enclosure 40' at enclosure outlet 45'. The walls 54', 56' and the air and waste gas paths are dimensioned to interfere with noise transmission but not restrict air flow into or waste gas out of apparatus 20'. Alternately, if input vent 43' is located in the back side wall of top shell half 42' and exhaust vent 45' is located in the front side wall of bottom clam shell half 44', the separator walls 54', 56' may be dispensed with. As with the first embodiment, top shell half 42' or bottom half 44' preferably includes a flexible VITON® seal (not shown) near the mating surfaces and extending fully from the cradle to the sides of halves 42', 44'.

Both shell halves 42' and 44' are shown to be lined on their interior with a sound reducing foam material 61'. Although not shown, cradle portions 48', 50' also may be lined with a foam similar to foam 61' on their exterior surfaces to cushion apparatus 20' when placed in enclosure 40'.

Bottom half 44' may also include an auxiliary fan 60' to assist the waste gas flow if appropriate to maintain proper air and waste gas flow.

Mounted at the front interface of clam shell halves 42', 44' is a transition tube 62' connectable at its inner end to patient outlet 24' when apparatus 20' is placed in sound enclosure 40' and at its outer end to a cannula used to deliver the product gas to the patient. Suitably positioned on the outer wall of lower clam shell half 44' may be a control panel 64' which is electrically connectable by a cable through a socket 68' in the outer wall of apparatus 20' to the internal circuit board of apparatus 20' to enable operation of selected ones of the accessible controls in apparatus 20'. The circuit in apparatus 20' also may be configured to cause the selected controls on the apparatus to be made inoperable upon connection of the cable to socket 68'. An external audible signal may also be included in panel 64' to amplify the buzzer sound when a disconnect or an apnea event is detected.

Although not illustrated, if the inlet 43' and/or outlet 45' are positioned not on the end wall, but rather midway along the top and/or bottom walls, respectively, the enclosure may also incorporate a sound deadening foam to fill the spaces (e.g., at the rear of top half 42' and at the front of bottom half 44') between the enclosure 40' and apparatus 20' not in the path of ambient air or waste gas.

It will be understood that various modifications and substitutions may be made to the described embodiment without departing from the spirit of the invention. Accordingly, the described preferred embodiment is intended for purposes of illustration and not as a limitation.

The invention claimed is:

1. A sound enclosure for a pressure swing adsorption apparatus producing an oxygen concentrated gas comprising at least two sections to substantially enclose the apparatus when the sections are joined, means within the sections for nesting the apparatus in the enclosure, inlet means in one of the sections for allowing ambient air into the enclosure and outlet means in the other section for enabling waste gases from the apparatus to exit the enclosure without adversely affecting flow rates, and means for causing at least one of the ambient air and waste gases substantially to change direction within the enclosure before entering or exiting the apparatus.

2. The sound enclosure of claim 1 and further comprising means for isolating from each other the interior spaces of the two sections when a pressure swing adsorption apparatus is enclosed by the enclosure.

3. The sound enclosure of claim 2, in which the isolating means comprises a flexible seal affixed to at least one of the sections and engaging the enclosed apparatus.

4. The sound enclosure of claim 2, in which the sections comprise outer walls and the isolating means comprises an internal wall between the nesting means and at least one of the outer walls.

5. The sound enclosure of claim 1, in which the apparatus includes operating controls and at least one of the sections comprises means interconnected with the apparatus for connecting a gas delivery device to deliver the produced oxygen concentrated gas to a patient and/or for enabling selected operating controls of the apparatus to be accessed from outside the enclosure.

6. A compact and portable oxygen delivery apparatus for medical uses by producing from ambient air a product gas having a high concentration of oxygen and delivering the product gas to a user of the apparatus, the apparatus comprising a first housing portion, two pressure swing adsorber beds mounted on the housing portion alternately to receive ambient air and adsorb nitrogen from the ambient air to produce the oxygen concentrated product gas, a compressor and a cam valve, the compressor and cam valve mounted on the housing portion and nested between the adsorber beds.

7. The apparatus according to claim 6 and further comprising a fan for drawing ambient air into the apparatus and nested between the adsorber beds, a motor driving both the compressor and the fan, and cover means for partially enclosing the fan and the compressor to direct ambient air into the compressor.

8. The apparatus according to claim 7, and further comprising a regulator for controlling the pressure of the product gas, a flow controller for controlling the initiation and timing of the flow of product gas, in which the cover means comprises means for supporting the regulator and the flow controller.

9. The apparatus according to claim 6 and further comprising a second housing portion to enclose the apparatus, in which one of the housing portions defines access means for enabling ambient air to be drawn into the apparatus, and the other housing portion defines means enabling waste gases and cooling ambient air to be expelled from the apparatus.

10. The apparatus according to claim 9, in which one of the housing portions comprises movable means for receiving and enabling pivoting of a cannula connector.

\* \* \* \* \*